United States Patent
Kuhnen et al.

(10) Patent No.: US 8,536,746 B2
(45) Date of Patent: Sep. 17, 2013

(54) ELECTROMOTIVE ADJUSTMENT DRIVE FOR A MOTOR VEHICLE

(75) Inventors: Thorsten Kuhnen, Litzendorf (DE); Karl-Heinz Rosenthal, Baunach (DE); Matthias Markert, Hassfurt (DE); Uwe Christian, Marktzeuln (DE)

(73) Assignees: Brose Fahrzeugteile GmbH & Co., Hallstadt (DE); Kommanditgesellschaft, Hallstadt (DE)

( * ) Notice: Subject to any disclaimer, the term of this patent is extended or adjusted under 35 U.S.C. 154(b) by 14 days.

(21) Appl. No.: 13/335,599

(22) Filed: Dec. 22, 2011

(65) Prior Publication Data

US 2012/0161561 A1    Jun. 28, 2012

Related U.S. Application Data

(63) Continuation of application No. PCT/EP2010/002770, filed on May 6, 2010.

(30) Foreign Application Priority Data

Jun. 22, 2009 (DE) ............... 20 2009 008 646 U

(51) Int. Cl.
   H02K 5/14   (2006.01)
   H02K 11/00  (2006.01)
   H02K 7/11   (2006.01)

(52) U.S. Cl.
   USPC ................ 310/72; 310/68 R; 310/239

(58) Field of Classification Search
   USPC ...................... 310/68 B, 71, 239
   See application file for complete search history.

(56) References Cited

U.S. PATENT DOCUMENTS

| | | | |
|---|---|---|---|
| 2005/0040715 A1 | 2/2005 | Nesic | |
| 2006/0208586 A1* | 9/2006 | Guttenberger | 310/71 |
| 2008/0315711 A1* | 12/2008 | Grimm et al. | 310/239 |
| 2009/0121578 A1* | 5/2009 | Benkert | 310/239 |

FOREIGN PATENT DOCUMENTS

| | | |
|---|---|---|
| DE | 43 37 390 A1 | 4/1995 |
| DE | 101 08 414 A1 | 9/2002 |
| DE | 103 18 734 A1 | 11/2004 |
| DE | 10 2005 055 740 A1 | 6/2006 |
| DE | 20 2007 003 648 U1 | 8/2007 |
| DE | 10 2007 010 865 A1 | 9/2008 |
| EP | 1 703 620 A2 | 9/2006 |
| EP | 1 710 893 A1 | 10/2006 |

* cited by examiner

*Primary Examiner* — Tran Nguyen
(74) *Attorney, Agent, or Firm* — Muncy, Geissler, Olds & Lowe, PPLC

(57) ABSTRACT

An electric-motor adjustment drive is provided for an adjustment element in a motor vehicle, in particular a window lifter, that has a drive module, which includes a pole pot that supports a motor shaft, and having an electronic module having a circuit board, which can be inserted into a housing of a brush holder, which housing is connected to the drive module. The circuit board is retained in an insertion plane perpendicular to the motor shaft by the housing of the brush holder in a form- and/or force-closed manner, wherein a number of contact elements for motor contacting and/or for interference suppression are arranged in the housing, which contact elements are contacted within the housing when the circuit board is inserted.

21 Claims, 10 Drawing Sheets

ELECTROMOTIVE ADJUSTMENT DRIVE FOR A MOTOR VEHICLE

This nonprovisional application is a continuation of International Application No. PCT/EP2010/002770, which was filed on May 6, 2010, and which claims priority to German Patent Application No. DE 20 2009 008 646.1, which was filed in Germany on Jun. 22, 2009, and which are both herein incorporated by reference.

BACKGROUND OF THE INVENTION

1. Field of the Invention

The invention relates to an electromotive adjustment drive for an adjustment element in a motor vehicle. An adjustment drive in this context can be understood to be, for example, a sunroof drive, a door drive, a rear door drive, a seat adjustment drive or a window lifter drive.

2. Description of the Background Art

A electromotive adjustment drive usually includes a drive module, which, in turn, may be composed of a motor module and a gear module, as well as an electronic module. The drive module includes an electric motor whose armature (rotor), which is mounted on a motor shaft, is rotationally supported in a pole pot in which permanent magnets are held in a bipole or multipole arrangement. The motor shaft protruding from the pole pot is guided into a gear housing having a worm gear, for example via a brush holder. An electronic module having a printed circuit board may be positioned on the gear housing in the manner of an interface. In this case, a mechanical connection is usually established between the electronic module and the gear housing, and the printed circuit board is also usually electrically contacted with motor contacts, which, in turn, are connected to carbon brushes of the electric motor, which is conventionally designed as a commutator motor.

For example, an electromotive window lifter drive, which has a modular design of the type described above, is known from DE 101 08 414 B4. The drive module, which includes the motor module and the gear module, is always the same, while the electronic module has different designs and which, in its diversity, may be provided with a modular configuration. The interface to the drive module is always the same, while the electronic module may be designed as a simple plug-in contact (power on/off) or as comparatively complex electronics. A distinction may also be made between positioning in a wet area and a dry area.

Due to the increasing number of electronic components for implementing different functions, the electromagnetic compatibility requirements are also higher. Interference must be avoided as reliably as possible, but at least dampened as effectively as possible. Any additional components needed for this purpose, for example coils (chokes) or capacitors, require additional installation space. In addition, it is desirable to integrate sensor electronics in the form of Hall sensors and a corresponding evaluation unit into the electronics or the electronic module.

To accommodate interference suppression electronics of this type in as little space as possible, it is known from DE 103 18 734 A1 to provide a separate printed circuit board which is inserted into the brush holder and is contacted via spring contacts.

A special clamping contact is furthermore known from DE 10 2005 055 740 A1, in which an electrical conductor, which, in turn, is designed as a spring contact, rests against a contact surface (contact pad) of the printed circuit board and is clamp-contacted with the pole pot for connecting to ground. The printed circuit board itself is, in turn, inserted into the gear or brush holder housing in a retaining groove provided in the housing base. The printed circuit board is held on a connector of the slide-in module.

SUMMARY OF THE INVENTION

It is therefore an object of the invention to provide an electromotive adjustment drive which has a particularly space-saving design with regard to the electronics and/or interference suppression.

The electromotive adjustment drive, in an embodiment, includes a brush holder whose housing has a plurality of contact elements, preferably for both contacting the motor and for interference suppression. Two contact elements are usually provided for contacting the motor, while a further contact element is provided for interference suppression, this additional contact element establishing an electrically conductive connection (ground connection) between the printed circuit board and the pole housing, for which purpose the pole housing is mounted on the housing of the brush holder. A flange-like housing collar of the brush holder housing serves as a stop for the pole pot, which is mounted on a holding shoulder of the brush holder housing.

The printed circuit board of an electronic module may be suitably inserted into at least one U-shaped insertion slot on an insertion plane perpendicular to the motor shaft, in particular it may be inserted by its end face facing the motor shaft. The motor shaft, which carries the rotor of the electric motor and which is supported in the pole pot, is guided out of the brush holder housing via the brush holder.

In a particularly suitable manner, the printed circuit board can be held in the housing, i.e., in the insertion slot or in each insertion slot provided therein, not only in a form-locked manner but also in a force-fit manner. A clamping tab, which is preferably molded onto the housing and is suitably elastically (or plastically) deformed while the printed circuit board is being inserted into the housing, is used for this purpose, thus ensuring a reliable clamping attachment between the printed circuit board and the housing. Two insertion slots as well as one clamping tab each are suitably provided upstream therefrom. These elements are suitably situated opposite each other on a circumferential housing edge on an underside of the housing facing away from the pol pot.

The insertion or holding slots may be designed to accommodate the printed circuit board from the direction of insertion as L-shaped housing moldings. The moldings project from the plane of the circumferential housing edge in the axial direction. However, the housing moldings are preferably T-shaped, thus forming diametrically opposed insertion slots. This makes it possible to insert a printed circuit board in the direction of insertion as well as counter to the direction of insertion (insertion counter-direction). This, in turn, particularly advantageously provides different designs of contacting or contact elements. Thus, the contact elements for a printed circuit board inserted in the insertion direction may be designed as spring contacts which are then clamp-contacted with contact surfaces (contact pads) provided on the printed circuit board. Alternatively, a classic blade contact, knife contact or clamping contact may preferably also be provided, which is then used to establish a corresponding contact with a printed circuit board inserted from the insertion counter-direction.

The contact elements, which can be designed as spring contacts, are suitably bent, stamped sheet metal parts. The actual contact arm having the contact end on the free end is bent at an obtuse angle from a holding arm with which the spring element is inserted into a longitudinal groove which is introduced into the housing of the brush holder and extends in the axial direction.

An interference suppression contact of a similar design suitably has a raised contact tab on the free end of the holding arm, so that a clamping contact between this interference suppression spring contact and the pole housing, i.e., its inner wall, is reliably established when the pole pot is mounted on a corresponding shoulder contour of the housing. A corresponding groove, in which the holding arm of this anti-interference spring contact lies, is then open to the outside at least in the area of the shoulder contour of the brush holder housing which extends from the housing collar toward the pole pot.

Hall sensors, which are mounted on the printed circuit board in the form of a Hall IC, are preferably provided for a suitable sensor system which is used to detect the rotational direction and/or speed of the motor, in particular for the purpose of determining the position of the adjustment element operated by the adjustment drive, for example a window pane. A ring magnet, which rests on the motor shaft and rotates therewith, is used as the transducer. The ring magnet, which has a plurality of magnetic poles (north and south poles), may be advantageously situated particularly close to the printed circuit board, due to the reliable attachment of the printed circuit board to the brush holder housing and, at that location, suitably directly to the underside of its housing. This saves a substantial amount of space, since only minimal production-related deviations and tolerances are to be expected in this design embodiment of the adjustment drive according to the invention, and a comparatively small distance may therefore be allowed between the ring magnet and the printed circuit board.

In a particularly advantageous embodiment, only the part or board section of the printed circuit board which is covered by the brush holder housing is subjected to the unavoidable carbon abrasion of the brushes. The remaining board section, which is located outside the brush housing and is therefore not covered thereby, is protected against this carbon dust. This effect is achieved by the fact that the lower housing edge of the brush holder housing which faces away from the pole pot and faces toward the printed circuit board forms only an extremely small gap with the surface of the printed circuit board facing the lower housing edge. Even this small gap results in a reliably tight seal between the housing and the printed circuit board.

To optimize the sealing function, an additional sealing element in the form of a rubber or plastic seal may be provided in the area of the lower housing edge. When the printed circuit board is inserted into the insertion slot, the seal yields in the direction of the housing interior in the manner of a sealing lip and is thus pressed tightly against the surface of the printed circuit board.

The advantages achieved by the invention are, in particular, the fact that both a reliable attachment and a precise positioning of the printed circuit board are ensured, due to a form-locked and force-fit holding of the printed circuit board of an electromotive adjustment drive, which is inserted into a corresponding housing of a brush holder. The reliable attachment suitably offers the opportunity to avoid attaching the printed circuit board or to only comparatively slightly attach the printed circuit board in the electronic module (for example also in an electronic housing), where it would otherwise be additionally attached. The positioning accuracy suitably offers the opportunity to construct a particularly compact sensor system for the motor speed and/or direction of rotation and to provide, in particular, a printed circuit board which carries a ring magnet at a distance from the sensor which has up to now not been possible in practical terms, along with an evaluation electronic system for evaluating and/or preprocessing the sensor signals.

The reliable clamping attachment of the printed circuit board to the brush holder housing is suitably provided by clamping elements molded on the housing in the form of web-like clamping tabs which have been worked from the housing material. These clamping tabs are thus elastic in a particularly easy manner and thus have a spring effect which establishes a friction fit or a force fit.

One aspect which is independent of this clamping attachment is the easily produced sealing effect between the brush holder housing and the printed circuit board. This is due to the fact that the insertion, fixing, and/or guide elements for the printed circuit board are situated on the underside of the housing of the brush holder in such a way that the printed circuit board partially seals the brush holder housing on the bottom. In other words, the housing wall of the brush holder housing practically reaches as far as the printed circuit board, so that, to this extent, a nearly adequate sealing effect is achieved against the unavoidable carbon dust of the brushes. An additional sealing lip may be easily integrated into the housing.

This sealing effect, including the protection of the printed circuit board section running outside the brush holder housing against carbon dust even without the additional force-fit printed circuit board attachment and/or the particularly variable and flexible contacting in the direction of insertion and against the direction of insertion is viewed as an independent invention.

The aspect of contacting the printed circuit board both in the conventional manner with the aid of conductor or clamping contacts as well as with the aid of spring contacts which are contacted with contact surfaces (pads) on the printed circuit board is, in turn, also viewed as an independent invention, independently of the sealing functionality as well as of the clamping attachment with the aid of the clamping element which is also referred to below as the clamping eye. This approach provides a particularly flexible brush holder in which the relevant contacting variant is achieved only by inserting the printed circuit board in one direction of insertion or another.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
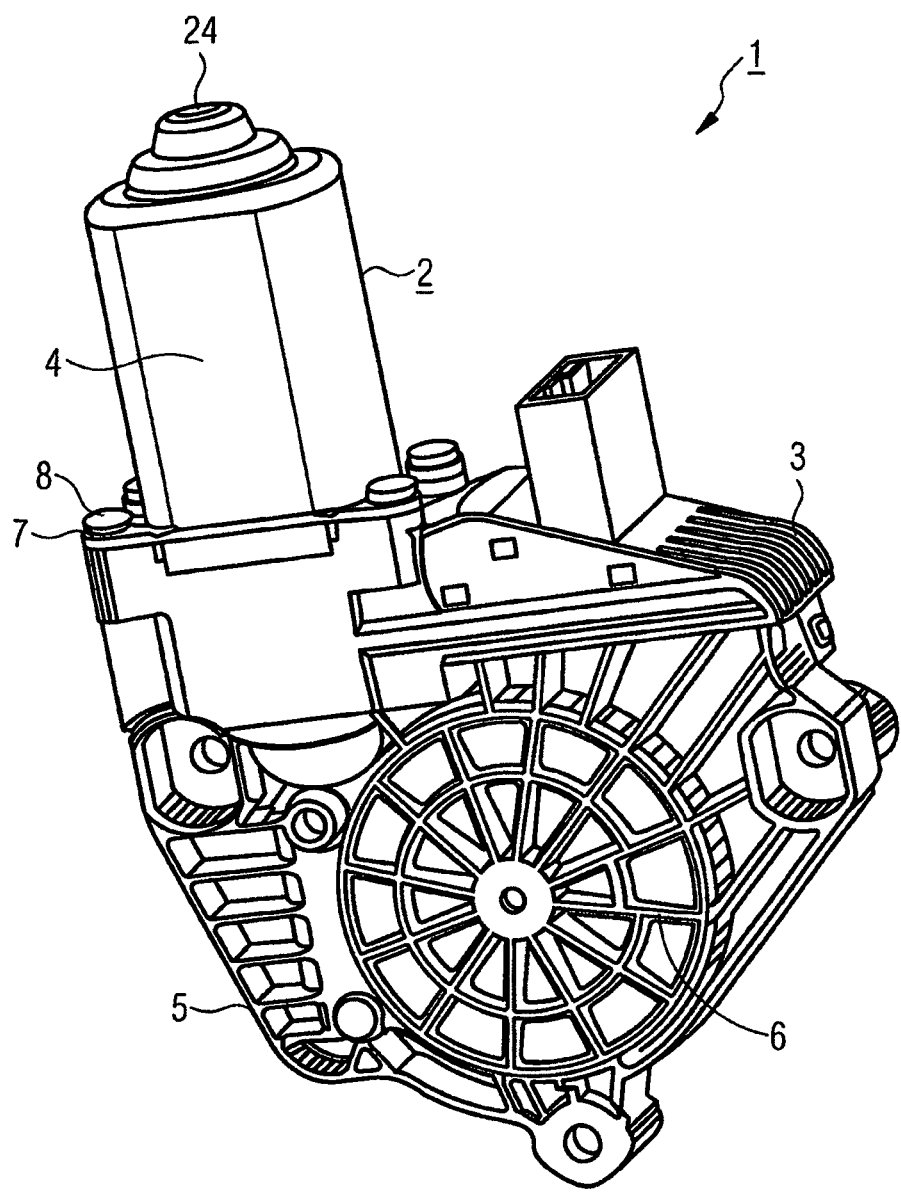
FIG. 1 shows a perspective representation of an electromotive adjustment drive having a drive module and an electronic module.

Corresponding parts are provided with the same reference numerals in all figures.

FIG. 1 shows an electronic adjustment drive 1 comprising a drive module 2 and comprising an electronic module 3. Drive module 2 includes a motor module having a pole pot 4 and a gear module 5. Gear module 5 includes a worm gear, which is not illustrated in further detail, which has a worm wheel which engages with a worm situated on a motor shaft. In the exemplary embodiment, the connection between pole pot 4 and gear housing 6 is a screw connection 7.

Figure 2:
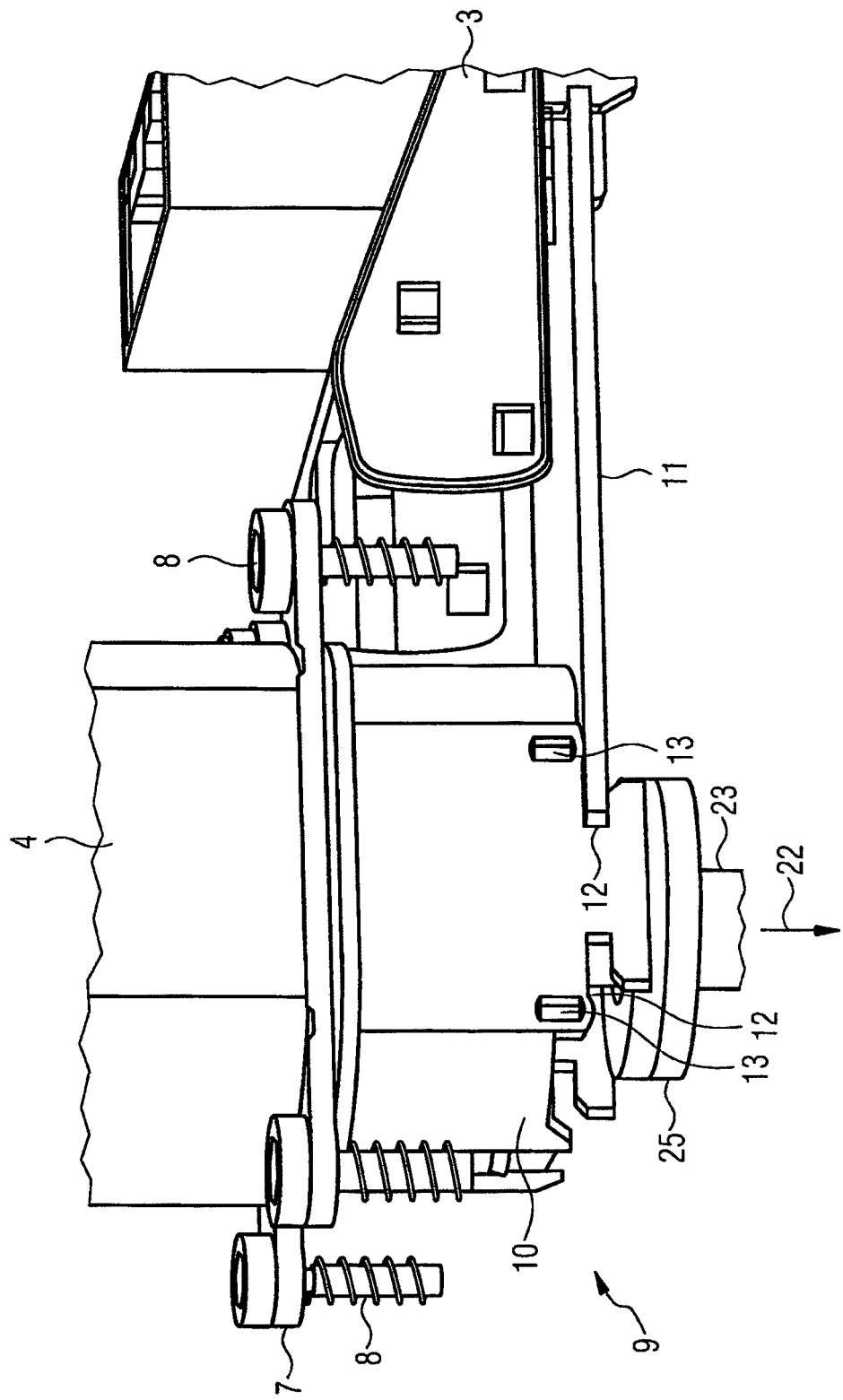
FIG. 2 shows a perspective representation of the interface, designed as a mechanical clamping attachment, between a brush holder of the drive module and a printed circuit board of the electronic module.

As may be seen comparatively clearly from FIG. 2, a brush holder 9 having a brush housing 10 is situated in the area of this screw connection 7, in which pole pot 4 is screwed to gear housing 6 with the aid of, for example, four screws 8. A printed circuit board 11, which is assigned to electronic module 3 and which is equipped with electronic components of the SMD type (surface-mounted devices), is inserted into this housing 10 of brush holder 9 on the underside of the housing. Printed circuit board 11 is inserted in a form-locked manner into a U-shaped insertion slot 12 of brush holder housing 10. A clamping eye 13 having a clamping tab 14 in brush holder housing 10 establishes a force-fit, elastic clamping connection between printed circuit board 11 and brush holder housing 10.

Figure 3:
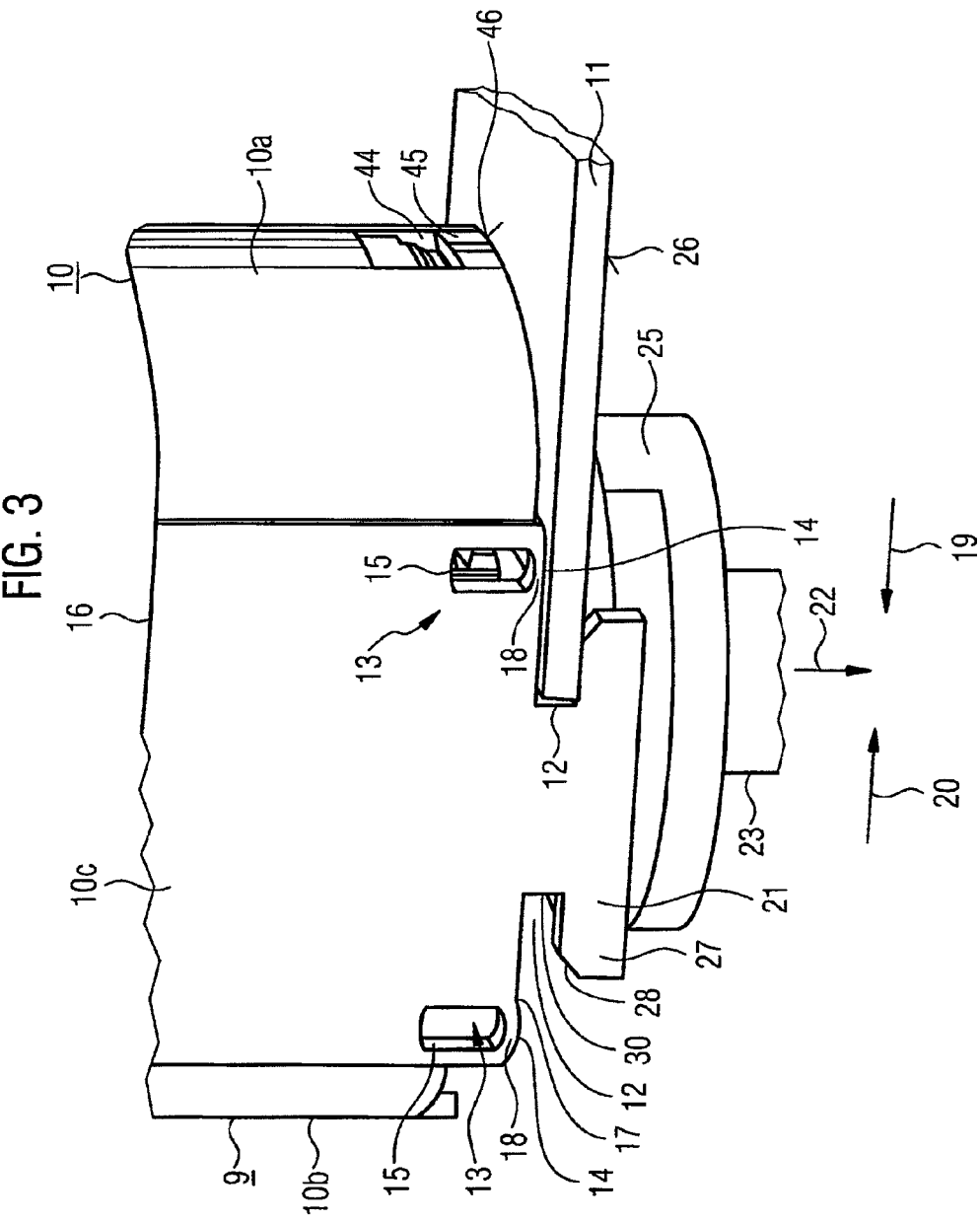
FIG. 3 shows the clamping area between the printed circuit board and the brush holder housing in the area of a clamping eye on a larger scale.

FIG. 3 shows the area of the clamping connection between printed circuit board 11, which is inserted into U-shaped insertion slot 12, and brush holder housing 10. Clamping eye 13 is formed by a recess or through-opening 15 in housing wall 16 of housing 10. A relatively narrow edge or housing web 18, which forms the outside of clamping tab 14, is provided on housing underside 17 of brush holder housing 10, due to recess 15. This housing web is situated upstream from U-shaped clamping slot 12 in insertion direction 19 or in counter-direction (insertion counter-direction) 20, which is also illustrated in FIG. 3.

A printed circuit board 11, which is inserted in counter-direction 20 in a manner which is not illustrated in greater detail, is also accommodated by a U-shaped insertion slot 12 and clamped in place in a form-locked and force-fit manner by clamping tab 14, which, in turn, forms a clamping eye 13.

Figure 4:
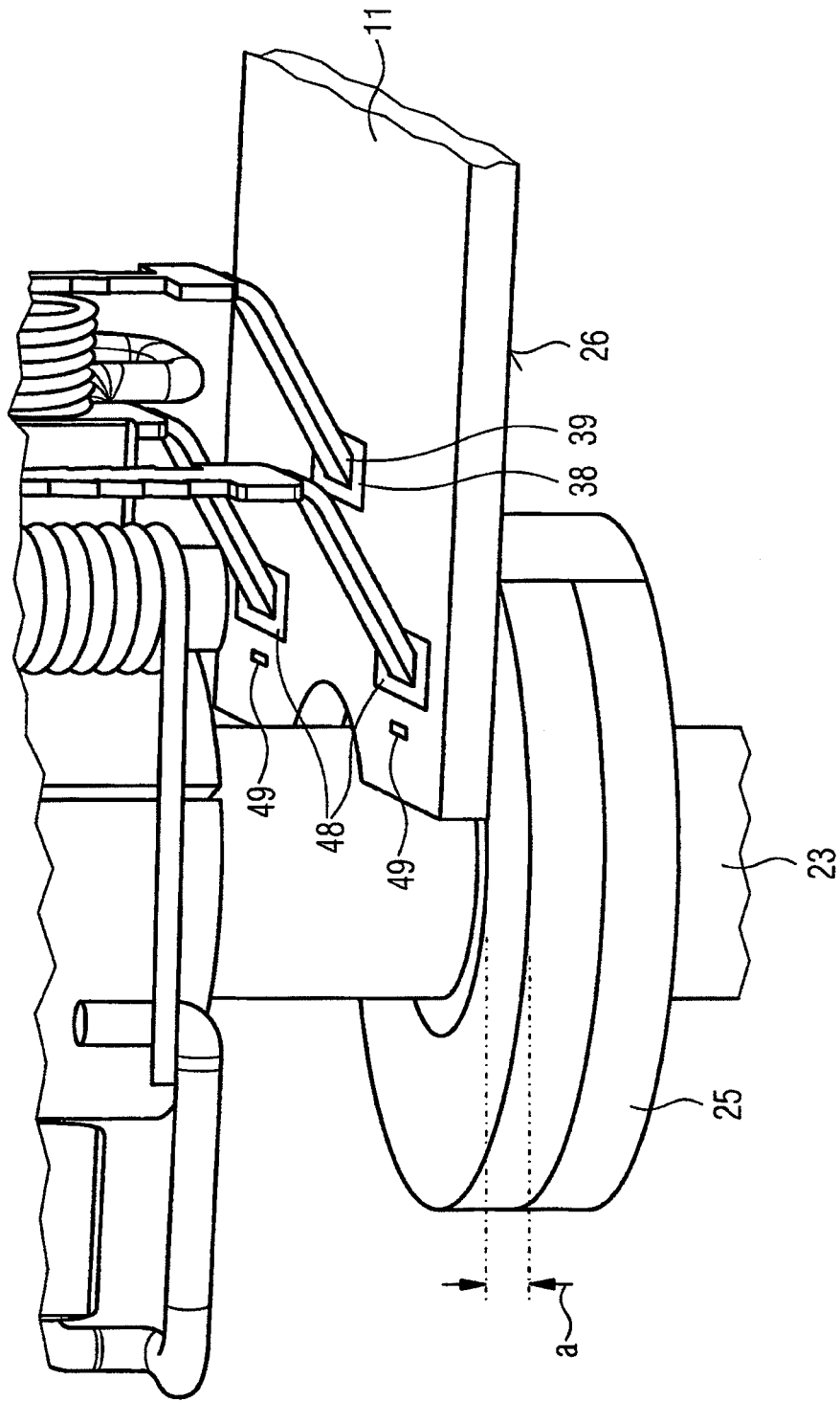
FIG. 4 shows the electrical interface between spring contacts and the printed circuit board as well as the situating of a ring magnet opposite a sensor system on the printed circuit board.

The two anti-parallel, U-shaped insertion slots 12 are formed by a T-shaped housing molding 21, which extends on housing underside 17 in axial direction 22. A motor shaft 23, which is illustrated in FIGS. 2 through 4 and which is supported on axial and/or radial bearing 24 (FIG. 1) within pole pot 4, runs in axial direction 22 and extends beyond brush holder 9 into gear housing 6 of gear module 5. A ring magnet 25 is nonrotationally connected to motor shaft 23. This magnet is situated on board underside 26 of printed circuit board 11 facing away from pole pot 4 at (an ideally short) distance a (FIG. 4).

Figure 5:
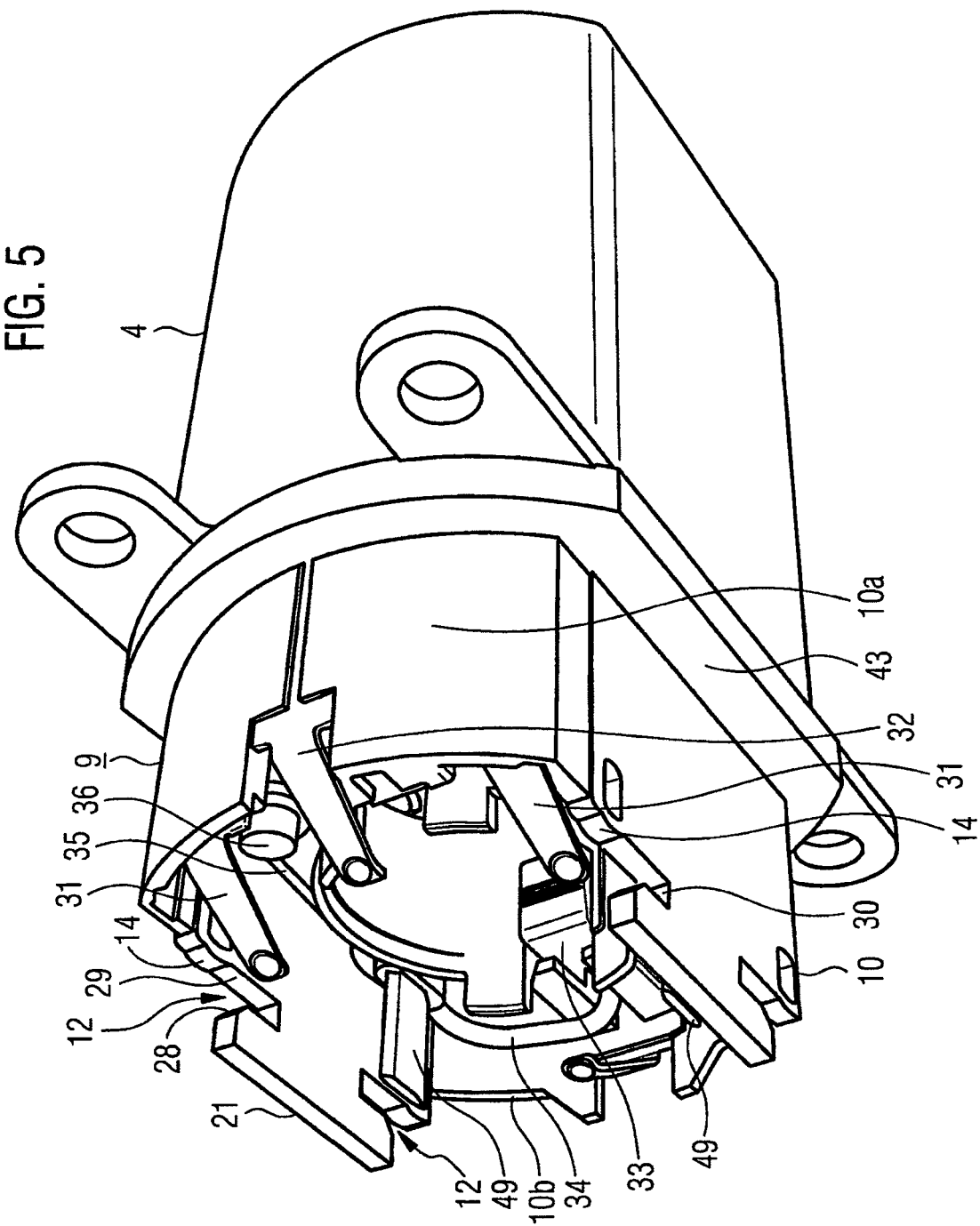
FIG. 5 shows a perspective representation of the brush holder having a mounted pole housing in an oblique view of the housing underside of the brush holder.
Figure 6:
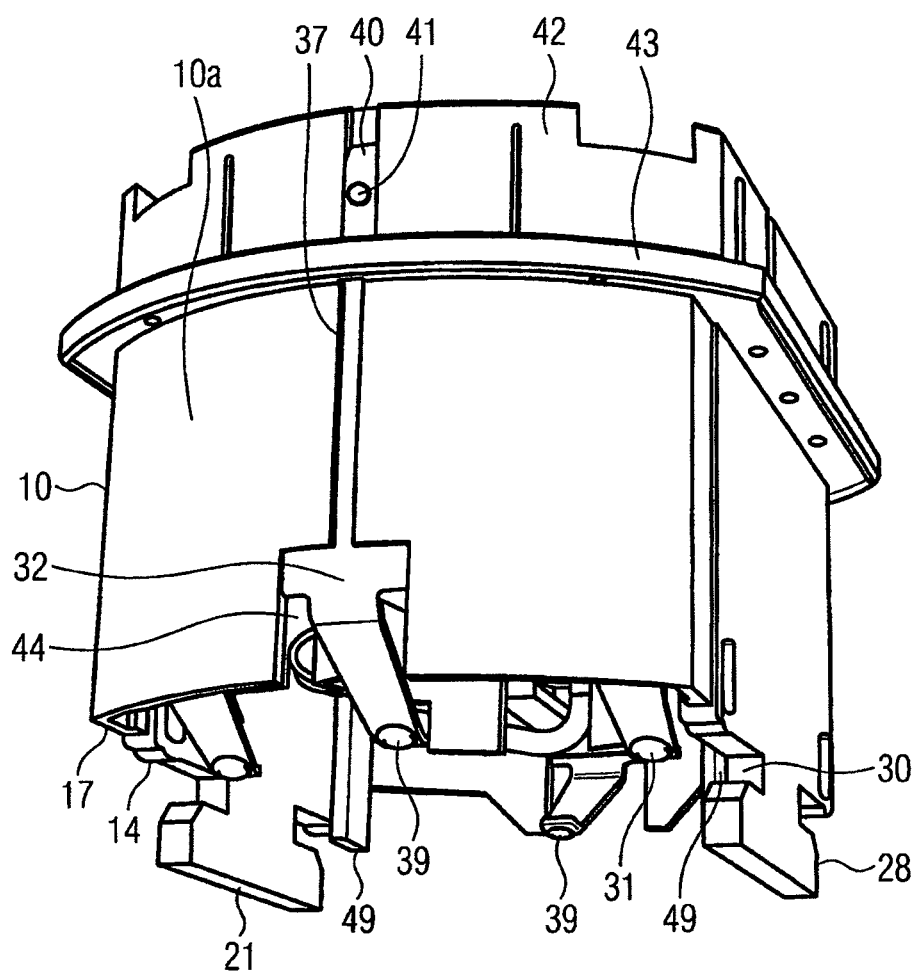
FIG. 6 shows a perspective side view of a curved housing side of the brush holder, including contact elements inserted therein.

FIGS. 5 and 6 each show a perspective representation of brush holder 9, together with its housing 10, including and excluding a mounted pole pot 4. It is apparent that two insertion slots 12 for printed circuit board 11 are each provided in both insertion direction 19 and in counter-direction 20. An inclined ramp 28 is provided on U-shaped arm 27 facing away from housing underside 17 as an insertion aid for printed circuit board 11. This U-shaped arm 27, which is spaced a distance equal to the clear width between insertion slot 12 and housing underside 17, is thus an integral part of housing molding 21. The U-shaped arm of insertion slot 12, which is situated opposite this U-shaped arm 27, is formed by a circumferential housing edge 29 on housing underside 17 of brush holder housing 10. Housing edge 29 on the underside of the housing is at least approximately continuously circumferential.

It is apparent that clamping tab 14 provided by clamping eye 13 is situated at a distance from slot or groove bottom 30 of particular insertion slot 12 in insertion direction and counter-direction 19, 20. Clamping tab 14 is not covered by U-shaped arm 27 opposite housing edge 29 (cover-fee) and is therefore situated upstream from insertion slot 12 in insertion direction 19 and counter-direction 20.

Figure 9:
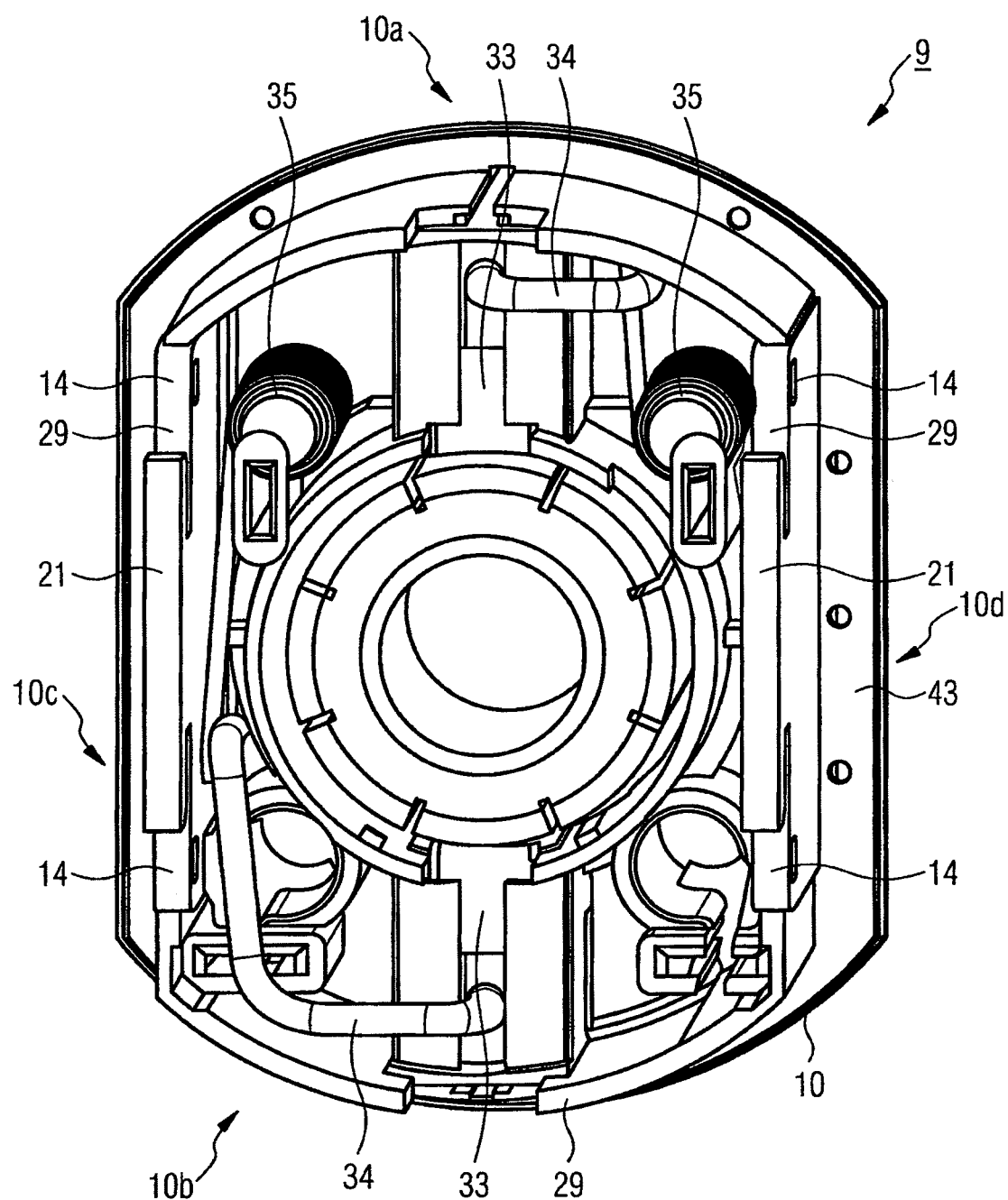
FIG. 9 shows the brush holder in a perspective view from below of the housing underside, including the circumferential housing edge.

Like pole pot 4, housing 10 of brush holder 9 has an oval cross-sectional shape with two diametrically opposed curved or arc-shaped housing sides 10a, 10b and two flat sides 10c, 10d. Three spring contacts 31 and 32 are held in or on housing wall 16 in housing 10 of brush holder 9 in the area of one of the two curved housing sides 10a, namely the housing side facing insertion direction 19 in the exemplary embodiment. Spring contacts 31 represent motor contacts which are connected to carbon brushes 33 in brush holder 9. These carbon brushes, in turn, are connected to an interference suppression choke 35 via a conductor wire 34, the interference suppression choke being mounted on a holding mandrel 36 within brush holder 9. One interference suppression choke 35 is suitably assigned to each of the two brushes 33 (FIG. 9).

As is comparatively clearly apparent from FIG. 6, spring contact 32 acting as an interference suppression contact is introduced into a housing groove 37 in housing wall 10a which is at least partially open to the outside. A positioning and embodiment of a spring contact 32 of this type are also used in a corresponding housing groove 37 on diametrically opposed curved housing side 10b of brush holder housing 10.

As is apparent from FIG. 4, spring or interference suppression contact 32 is contacted with printed circuit board 11 via a contact surface 38 which is preferably designed as a solder pad. One contact end 39 of spring contact 32 is pressed against contact surface 48 under adequate spring pretension.

According to FIG. 6, a further contact surface 40 is provided on the diametrically opposed free end of spring contact 32. Via this contact surface 40, spring contact 32 rests against the inner wall of pole pot 4 when the latter is mounted or pushed onto brush holder housing 10—as is comparatively clearly apparent from FIG. 5. The free end of spring element 32 forming contact surface 40 is at least slightly raised out of insertion groove 37. For this purpose, a raised stamped tab 41 is embossed into spring contact 32 in the area of contact surface 40.

Brush holder housing 10 has a holding shoulder 42 which is delimited by a circumferentially molded housing or support collar 43. This collar is used as a sealing stop for pole pot 4 mounted on holding shoulder 24. Since contact surface 40 protrudes from insertion groove 37, a simple yet reliably electrically conductive clamping contact connection is established between pole pot 4 and spring contact 32 when pole pot 4 is mounted.

Figure 7:
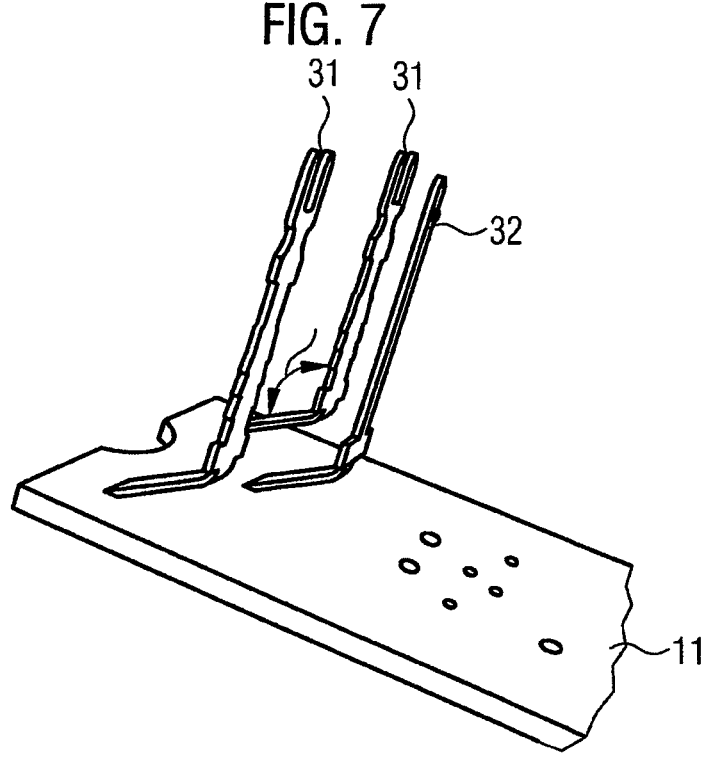
FIG. 7 shows a schematic perspective representation of the situation of the bent spring contacts relative to the printed circuit board.
Figure 8:
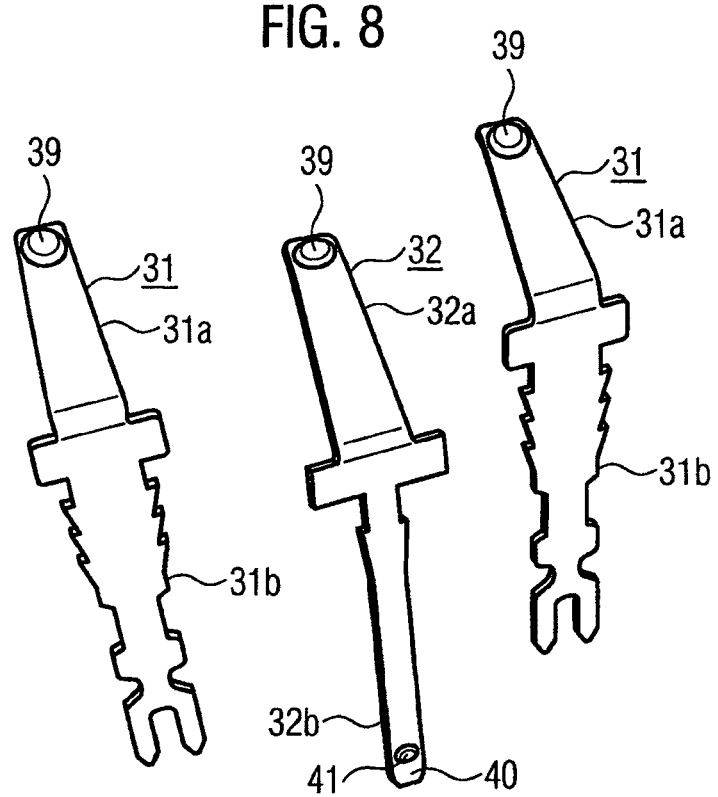
FIG. 8 shows the spring contacts according to FIG. 7 in the form of motor and interference suppression contacts in their embodiment as stamped sheet-metal parts.

Spring contact 32, which is illustrated as a stamped sheet metal part in FIGS. 7 and 8, is inserted into side wall 10a or 10b via a window 44 which is provided in particular curved side wall 10a, 10b. Window 44 illustrated in the figures is advantageously closed on the housing underside, so that a continuous housing edge 29 is formed in that location, at least in the area of coverage with printed circuit board 11.

Figure 11:
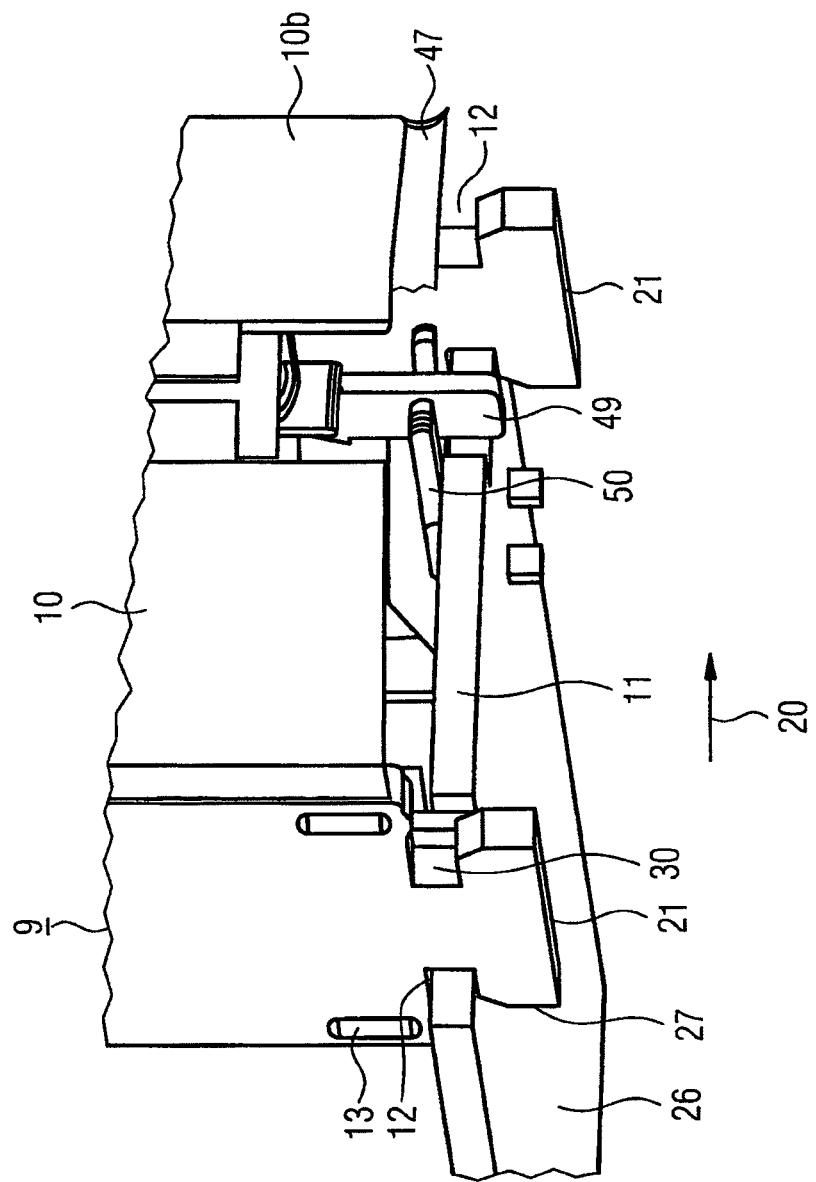
FIG. 11 shows the brush holder according to FIG. 10 in a perspective partial view, including the bifurcated contact of the clamping contact on the printed circuit board side.

FIG. 3 shows the completely closed termination between particular housing side wall 10a, 10b of brush housing 10 and printed circuit board 11. It is apparent therein that window 44 is sealed on housing underside 17 with the aid of a housing web 45. This ensures that side wall 10a, 10b, which is brought as close as possible to printed circuit board 11, leaves no or only a small slot 46 free. A slot of this type may be sealed with the aid of a sealing lip 47, a section of which is illustrated in FIG. 11, and which is attached to housing side wall 10a, 10b on housing underside 17.

Due to the seal between housing 10 and printed circuit board 11, the area of printed circuit board 11 which is covered by brush holder 9 is hermetically sealed by the board area or section of printed circuit board 11 located on the outside. As a result, it is possible to contain within housing 10 carbon dust, which is practically unavoidable and which occurs as a result of the motor rotation and the spring-loaded contacting of carbon brushes 33 on the commutator (not illustrated). Components which are mounted on printed circuit board 11 and are located outside housing 10 therefore do not come into contact with this carbon dust.

FIG. 7 shows contact elements 31, 32, which are designed as spring contacts, in their contacting position above printed circuit board 11. They are arranged in an approximately triangular configuration, spring contact 32 acting as the interference suppression contact being situated between the two spring contacts 31 acting as motor contacts and also set back in relation thereto—due to the curve of side wall 10a, 10b.

Spring contacts 31, 32 are designed as stamped sheet metal parts and bent at an angle α between 90° and 180°. Both contact elements 31 acting as motor contacts and contact element 32 acting as the interference suppression contact each form a contact arm 31a, 32a and a holding arm 31b or 32b. With the aid of holding arm 32b, which may be designed to have latching elements, contact elements or spring contacts 31, 32, are attached to corresponding housing wall 10a, 10b of brush holder housing 10 and, for this purpose, inserted into corresponding grooves therein. Contact end 39 of free-standing contact or spring arm 31a, 32a then lies under corresponding spring pretension on contact surfaces 48 of printed circuit board 11 for motor contacting or on contact surface 38 for connection to pole pot 4 in a contact-secure manner when printed circuit board 11 is inserted.

As is comparatively clearly apparent from FIG. 4, printed circuit board 11 carries, for example, two Hall sensors 48, which are spaced a distance apart and whose sensor surfaces (not illustrated) face ring magnet 25 on printed circuit board underside 26.

Figure 10:
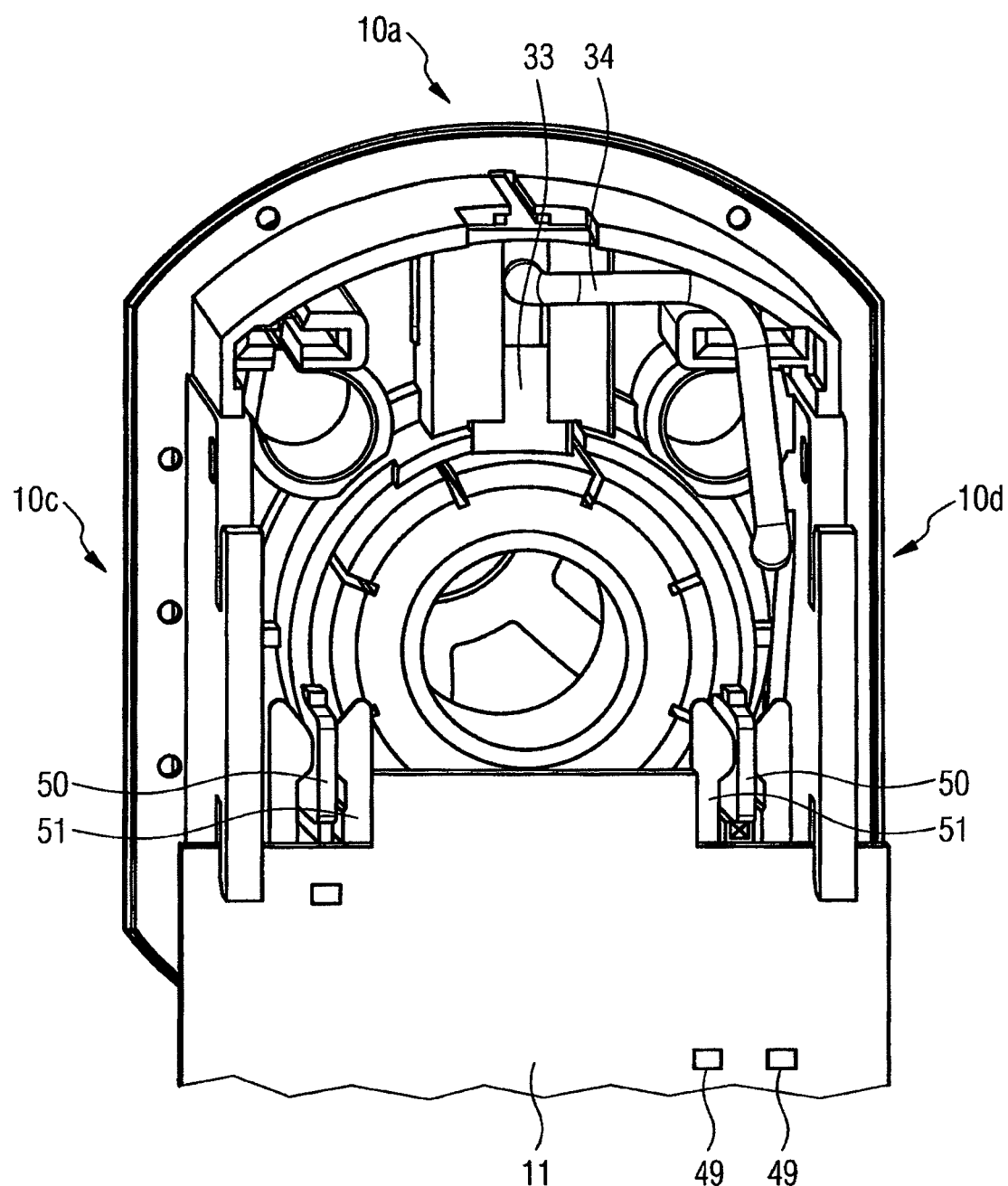
FIG. 10 shows a perspective representation of the lower housing area of the brush holder, with the printed circuit board inserted and clamp-contacted.

FIGS. 10 and 11 show an exemplary embodiment of a conventional knife or blade or clamping contact having contact elements on the brush side which are designed as flat contacts 50 and bifurcated contacts 51 on the printed circuit board side, which are mounted on printed circuit board 11. When a printed circuit board 11 of such a design is inserted in insertion counter-direction 20, the tines of bifurcated contacts 51 engage with particular flat contact 50 to establish a reliable clamping contact. Two contact surfaces of a Hall sensor 49 designed as a Hall IC (integrated circuit) may be seen on board underside 26 of printed circuit board 11.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electromotive adjustment drive for an adjustment element in a motor vehicle, the electromotive adjustment drive comprising:
   a drive module that has a pole pot supporting a motor shaft;
   an electronic module that has a printed circuit board, the printed circuit board configured to be insertable into a housing of a brush holder that is connectable to the drive module, the printed circuit board being held on an insertion plane substantially perpendicular to the motor shaft of the housing of the brush holder in at least one of a form-locked manner or a force-fit manner; and
   a plurality of contact elements configured for at least one of contacting the motor or interference suppression, the contact elements being situated in the housing and are contacted inside the housing when the printed circuit board is inserted.

2. The electromotive adjustment drive according to claim 1, wherein the housing has a U-shaped insertion slot provided with a circumferential housing edge on the housing underside facing away from the pole pot, wherein the printed circuit board is inserted in the U-shaped insertion slot and is held in a form-locked manner.

3. The electromotive adjustment drive according to claim 2, wherein one of the U-shaped arms of the insertion slot is formed by the housing edge, and the other U-shaped arm is formed by an L-shaped or T-shaped housing molding.

4. The electromotive adjustment drive according to claim 2, wherein a clamping tab is arranged upstream from the insertion slot along the housing edge in the insertion direction.

5. The electromotive adjustment drive according to claim 4, wherein the clamping tab curves away from the housing edge in a direction of the U-shaped arm facing away from the housing edge.

6. The electromotive adjustment drive according to claim 4, wherein the clamping tab is molded onto a housing web formed by a housing recess.

7. The electromotive adjustment drive according to claim 6, wherein the housing web carrying the clamping tab is elastically deformable.

8. The electromotive adjustment drive according to claim 1, wherein the housing has a circumferential housing edge that has two diametrically opposed U-shaped insertion slots that are aligned with each other, for the printed circuit board, on a housing underside facing away from the pole pot.

9. The electromotive adjustment drive according to claim 8, wherein the diametrically opposed insertion slots are each formed by T-shaped housing moldings such that the printed circuit board is insertable into the housing both in an insertion direction and in a counter-direction to the insertion direction.

10. The electromotive adjustment drive according to claim 1, wherein a motor or interference suppression contacting with the aid of contact elements takes place when the printed circuit board is inserted in an insertion direction, wherein contact surfaces or contact pads are provided as counter-contacts on the printed circuit board, and wherein the contact elements are configured as spring contacts.

11. The electromotive adjustment drive according to claim 10, wherein the motor contacting takes place with the aid of contact elements configured as a blade, knife or clamping contacts when the printed circuit board is inserted in the counter-direction.

12. The electromotive adjustment drive according to claim 1, wherein the housing has a holding shoulder that is delimited by a support collar and the pole pot is mounted on the support collar by clamp-contacting an interference suppression contact.

13. The electromotive adjustment drive according to claim 1, wherein the contact elements have a contact arm and a holding arm that are bent at an obtuse angle.

14. The electromotive adjustment drive according to claim 1, wherein the contact elements are inserted into a housing groove that is introduced into the housing of the brush holder and extends in an axial direction.

15. The electromotive adjustment drive according to claim 14, wherein the contact element has a raised contact tab for clamp-contacting with the pole pot.

16. The electromotive adjustment drive according to claim 1, wherein a housing wall of the housing is arranged against the printed circuit board for providing a seal against the discharge of carbon dust.

17. The electromotive adjustment drive according to claim 16, wherein a sealing element, a rubber sealing lip, or a plastic sealing lip, is provided on the housing in the area of the lower housing edge facing away from the pole pot.

18. The electromotive adjustment drive according to claim 1, wherein the motor shaft carries a ring magnet that is arranged at a distance from the printed circuit board, and wherein the motor shaft has at least one of a sensor system or at least one Hall sensor.

19. A brush holder for an electromotive adjustment drive of an adjustment element in a motor vehicle, comprising a housing that holds a printed circuit board in at least one of a form-locked manner or a force-fit manner and wherein the printed circuit board is contacted with at least one of motor contacts or interference suppression contacts, and wherein the has at least one insertion slot on the housing underside for inserting the printed circuit board, and wherein one arm of the insertion slot is formed by an at least approximately continuously circumferential housing edge.

20. The electromotive adjustment drive according to claim 1, wherein the adjustment element is a window lifter.

21. The brush holder according to claim 19, wherein the adjustment element is a window lifter.

* * * * *

UNITED STATES PATENT AND TRADEMARK OFFICE
CERTIFICATE OF CORRECTION

| | |
|---|---|
| PATENT NO. | : 8,536,746 B2 |
| APPLICATION NO. | : 13/335599 |
| DATED | : September 17, 2013 |
| INVENTOR(S) | : Kuhnen et al. |

It is certified that error appears in the above-identified patent and that said Letters Patent is hereby corrected as shown below:

On the title page item (73) should read

(73) Assignees: Brose Fahrzeugteile GmbH & Co. Kommanditgesellschaft, Hallstadt, Hallstadt (DE)

Signed and Sealed this
Fifth Day of November, 2013

Teresa Stanek Rea
*Deputy Director of the United States Patent and Trademark Office*